May 31, 1949.　　　　B. C. COONS　　　　2,471,479
PEAR ORIENTING AND FEEDING APPARATUS
Filed Dec. 5, 1944　　　　　　　　　　　　　　4 Sheets-Sheet 1

Inventor
BURTON. C. COONS
By Philip A. Minnis
Attorney

May 31, 1949. B. C. COONS 2,471,479
PEAR ORIENTING AND FEEDING APPARATUS
Filed Dec. 5, 1944 4 Sheets-Sheet 2

May 31, 1949.  B. C. COONS  2,471,479
PEAR ORIENTING AND FEEDING APPARATUS
Filed Dec. 5, 1944  4 Sheets-Sheet 3

Inventor
BURTON C. COONS

May 31, 1949.  B. C. COONS  2,471,479
PEAR ORIENTING AND FEEDING APPARATUS
Filed Dec. 5, 1944  4 Sheets-Sheet 4

Inventor
BURTON C. COONS.
By Philip A. Minnis
Attorney

Patented May 31, 1949

2,471,479

UNITED STATES PATENT OFFICE 2,471,479

PEAR ORIENTING AND FEEDING APPARATUS

Burton C. Coons, San Jose, Calif., assignor to Food Machinery and Chemical Corporation, a corporation of Delaware Application December 5, 1944, Serial No. 566,693

17 Claims. (Cl. 198—33)

This invention relates generally to the fruit handling art and is more specifically concerned with the provision of an apparatus for orienting and feeding pears.

In the preparation of fresh pears for canning it is the customary commercial practice to perform the various preparatory operations such as peeling, stemming, coring, halving, etc. by the use of machines known to the art as pear preparation machines. Owing, however, to the difficulties involved in mechanically orienting and feeding the pears to the preparation machines, it has heretofore been the standard practice to feed them by hand, thereby making it necessary to provide an attendant for each machine. Moreover, since rapid manual orientation and feeding of the pears is a tedious and fatiguing operation, it has been found that the attendants are at times unable to keep up with the machines and must have frequent rest periods during which the machines must be shut down or relief attendants provided to feed them.

The apparatus of my invention is designed to perform the orienting and feeding operations mechanically so as to eliminate the need for hand feeding and the disadvantages referred to. It should be understood, however, that although the apparatus of my invention finds an important application in feeding pear preparation machines, its utility is by no means confined thereto as it may be utilized to orient and deliver pears or similarly shaped objects to any suitable place of reception where it is desired to deliver the pears in properly timed relation and in uniformly oriented position.

It is therefore a general object of my invention to provide a pear orienting and feeding apparatus adapted to feed the pears in properly timed relation and uniformly oriented position to a desired place of reception.

It is also an object of my invention to provide an apparatus of the character referred to which is capable of effective operation irrespective of variations in the size and configuration of the pears.

A further object of my invention is to provide a pear orienting and feeding apparatus in which the shape of the pears is utilized to assist in effecting the desired orientation.

Another object of my invention is to provide a pear orienting and feeding apparatus adapted to separate individual pears from a promiscuous mass thereof and to orient the pears and deliver them at timed intervals and in uniformly oriented position to a desired place of reception.

A further object of my invention is to provide a pear orienting and feeding apparatus which is capable of handling the fruit gently so as to avoid or minimize bruising or other injury to the fruit.

Additional objects and advantages of my invention will more readily become apparent from the following description taken in connection with the accompanying drawings in which.

Figure 1:
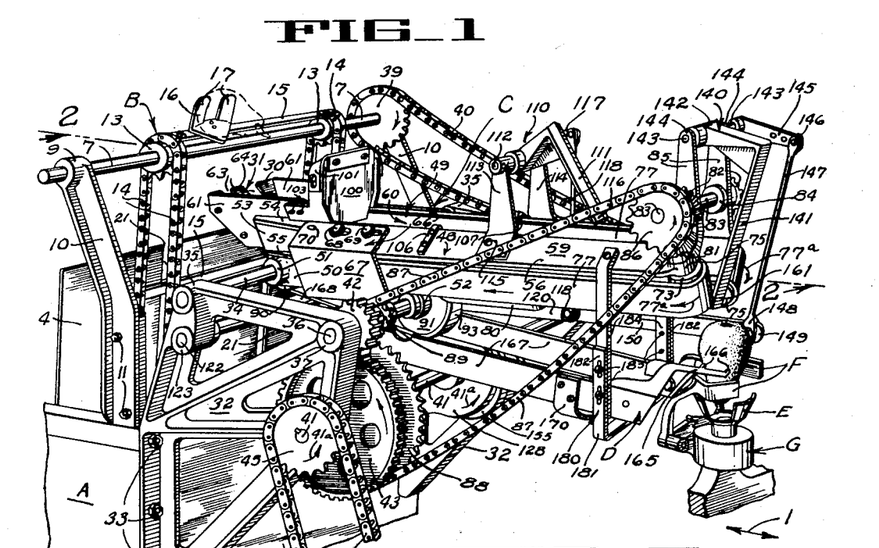
Fig. 1 is a perspective view of a machine embodying the present invention.
Figure 2:
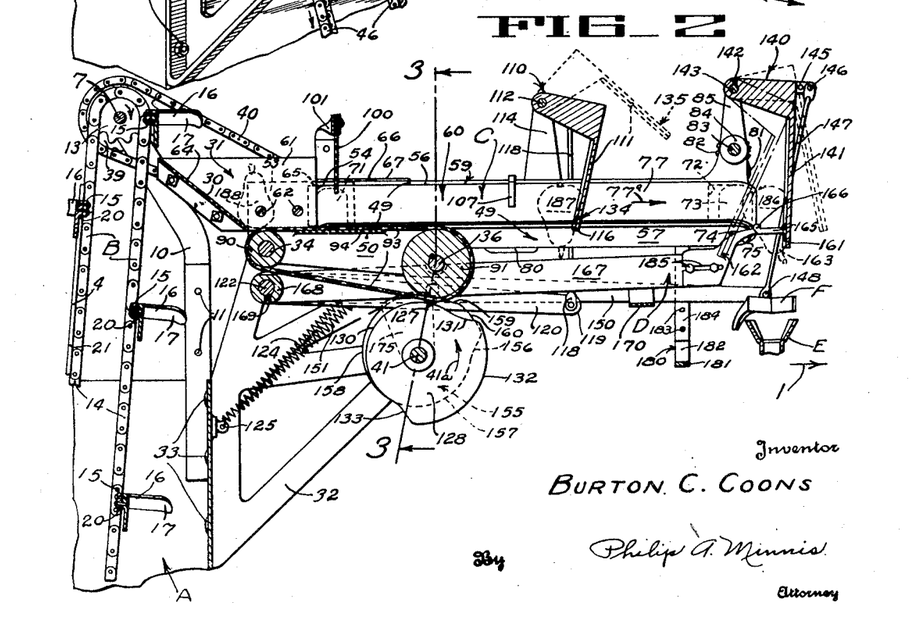
Fig. 2 is a longitudinal section taken along lines 2—2 of Fig. 1.
Figures 5, 6:
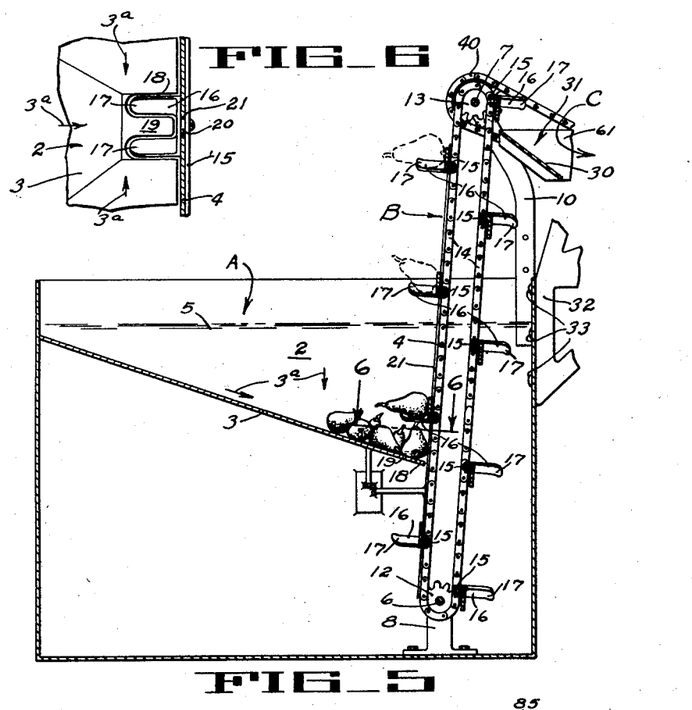
Fig. 5 is a longitudinal section through the feed hopper partially shown in Fig. 2.
Fig. 6 is a horizontal section of a portion of the feed hopper taken along line 6—6 in Fig. 5.

Referring first to Figs. 1, 2, and 5 of the drawings the mechanism illustrated comprises a supply hopper or tank A into which the pears may be dumped in a promiscuous mass and from which they are removed one at a time by an elevator B and delivered thereby to an orienting and feeding mechanism C which orients the pears into a predetermined position, i. e., stem end down with the stem blossom axis of the fruit disposed in substantially vertical position. The orienting and feeding mechanism C also conveys the pears and serves to discharge them at timed intervals into a transfer yoke D from which they are subsequently transferred to a desired place of reception such as the feed cup E of a pear preparation machine, which for purposes of the present disclosure may be assumed to be of the character disclosed in my prior Patent No. 2,187,075 dated January 16, 1940.

The feed cup E is provided with pear holding and aligned clamps F and is carried by a reciprocating carriage G. The carriage G is shown in fruit receiving position in Fig. 1 and reciprocates back and forth as indicated by arrow 1 in said figure from said fruit receiving position to a fruit impaling position within the fruit preparation machine, which latter is not shown herein as it is unnecessary to an understanding of the present invention.

The tank A (see Figs. 5 and 6) is provided with a fruit receiving hopper 2 formed in the upper portion thereof by a plate 3 and baffle 4. The plate 3 is pitched as indicated by arrows 3a toward the baffle plate 4 which separates the elevator mechanism B from the hopper 2. The tank A preferably contains a suitable body of water 5 to cushion the fall of the pears dumped in a promiscuous mass into the hopper 2. Although the pears sink in the water, they are less susceptible to bruising while at the same time bridging of the fruit is effectively prevented thereby. A film of water adheres to the pears as they are removed from the hopper and tends to lubricate the pears and minimize frictional engagement of the pears with certain timing and positioning means referred to later herein.

The elevator shown is of a common and well-known chain and cup type construction comprising parallel shafts 6 and 7 arranged in spaced relation on the tank. The lowermost shaft 6 is journalled in bearings 8 arranged in the lower portion of the tank while the uppermost shaft 7 is journalled in bosses 9 formed in upstanding brackets 10 secured by bolts 11 to the upper end of the tank. Secured to the shaft 6 for rotation therewith is a pair of sprockets 12, while secured to the shaft 7 is a pair of sprockets 13, and trained around each respective set of sprockets 12 and 13 is a chain 14. Extending between the two chains 14 at equally spaced intervals are transverse bars 15, each of which has secured thereto a cup 16 provided with spaced laterally-inclined fingers 17 to receive and support the fruit therebetween.

As shown in Figs. 5 and 6, the cups 16 are adapted to enter the fruit receiving hopper 2 of the tank A through an opening 18 formed in the plate 3. This opening is of such configuration as to permit passage of the cup fingers 17, while a central tongue 19, extending into the space between the same, prevents dropping of the pears through the opening 18 into the bottom of the tank. The cups 16 are spaced slightly from the transverse bars 15 by a mounting block 20, which, upon elevation of the cups by the chains 14, extends through a vertical slot 21 formed in the baffle 4, whereby the cups with pears therein are guided and supported laterally for elevation through the hopper 2. In the course of their travel each cup will pick up one pear for elevation therewith. As each cup 16 tilts over the top shaft 7, the pear carried thereby is discharged in a haphazard manner upon an inclined bottom 30 of a chute 31 formed at the extremity of the receiving end of the feeding and orienting mechanism C.

The feeding and orienting mechanism C is supported on a pair of spaced brackets 32 secured by bolts 33 to the corner posts of the tank A. The upper parts of the brackets 32 form a trusswork provided with aligned bosses for supporting a plurality of shafts in parallel relation.

Below the lower end of the inclined bottom 30 of the chute 31 is fixed shaft 34 having its ends supported in aligned bosses 35 formed in the spaced brackets 32 while a shaft 36 is rotatably mounted in aligned bosses 37 at the outer end of the spaced brackets 32. Keyed to one end of this shaft 36 is a sprocket gear 38 and trained around the same and a sprocket gear 39 fixed to the elevator shaft 7, is a sprocket chain 40. The shaft 36 is driven by a cam shaft 41 through intermeshing gears 42 and 43 keyed to shafts 36 and 41, respectively. The cam shaft 41 is rotatably mounted in bosses 44 of the brackets 32. Keyed to the cam shaft 41 is a sprocket wheel 45 which is driven through a chain 46 either directly by the pear preparation machine, or by a separate motor synchronized with the operation of the pear preparation machine, so that the shafts 41, 36, and the elevator shaft 7 are operated in timed relation with the reciprocating feed carriage G.

The feeding and orienting mechanism C comprises a pair of frames 48 and 49 spaced from each other and each having a depending web 50 provided with bosses 51 and 52 through which the spaced shafts 34 and 36, respectively, extend to support the discharge end of the feeding and orienting mechanism C in cantilever fashion substantially at right angles with respect to the elevator B.

Figure 3:
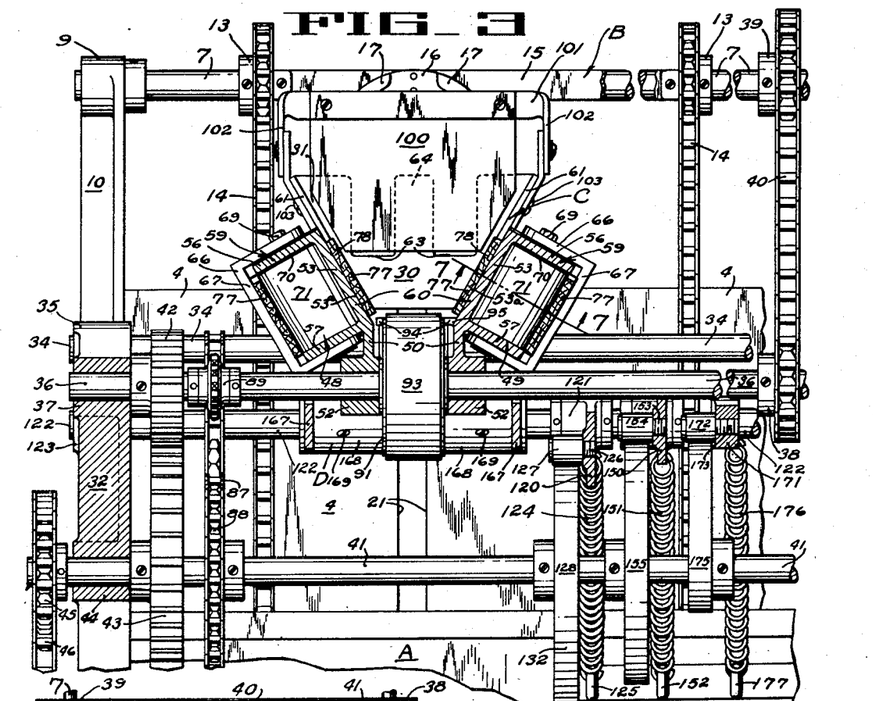
Fig. 3 is an enlarged vertical cross section taken along line 3—3 of Fig. 2.
Figure 4:
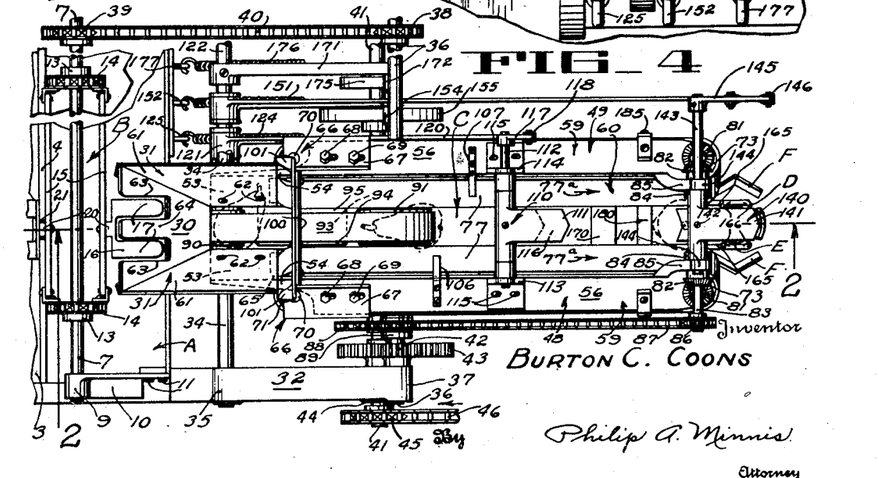
Fig. 4 is a plan view of Fig. 2 with the parts of the machine shown in a different position.

The frames 48 and 49 are of similar construction and, therefore, like reference numerals, will indicate like parts thereof. As seen in Figs. 1, 3 and 4, each of the frames 48 and 49 has an inclined side wall 53 formed integrally with the depending web 50 thereof. The side wall 53 has shallow ribs or flanges 54 and 55 at its upper and lower ends extending into integral flanges 56 and 57 to form a channel 59. The channels 59 extend from the receiving end to the discharge end of the feeding and orienting mechanism C, and have their web portions or side walls 53 angularly disposed to form an open bottomed V-shaped trough 60.

Positioned at the receiving end of the trough 60 is the chute 31, previously referred to, having its sidewalls 61 secured to the inclined sidewalls 53 of the frames 48 and 49 by means of countersunk screws 62. The chute 31 extends into the path of the travel of the fingers 17 of the cups 16 and is slotted as shown at 63 to permit passage of the fingers 17 therethrough and to provide a central tongue 64 for preventing pears or portions thereof from becoming lodged in the slots 63.

Figure 7:
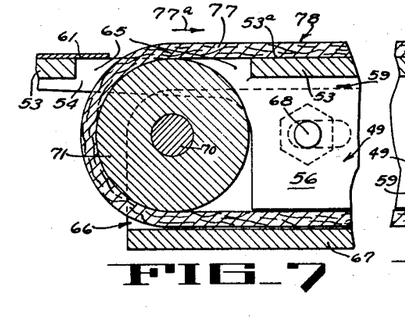
Fig. 7 is a section through the receiving end of one side wall of the feed trough taken along line 7—7 in Fig. 3.
Figure 8:
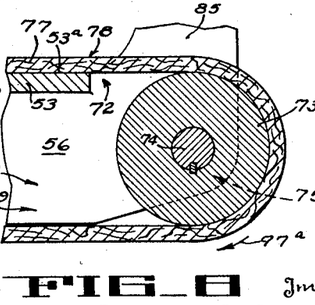
Fig. 8 is a section through the discharge end of the same side wall of the feed trough also taken along line 7—7 in Fig. 3 and complementary to the view of Fig. 7.

The side walls 53 are cut out adjacent the ends of side walls 61 of the chute 31 as shown at 65 in Fig. 7. A bearing member 66 consisting of a short channel section 67 is adjustably arranged in inverted position over the receiving end of each of the channels 59 by slot and bolt connections 68 and 69. Rotatably mounted in each bearing member 66 by means of the pivot shaft 70 is an idler pulley 71 (Fig. 7) which extends into the cut out portion 65 previously referred to. Both channels 59 are further cut away at 72 at the discharge end of the trough to receive a drive pulley 73 keyed to a shaft 74 rotatably mounted in bearings 75 formed by the flanges of the channels 59 (Fig. 8). Trained around the idler pulley 71 and the drive pulley 73 of each channel 59 is a lateral conveyor or trough belt 77. The idler and drive pulley of each channel 59 are so disposed that the side wall surface 53a of each channel is tangentially disposed with respect to the periphery of each pair of cooperating idler and drive pulleys so that the inner runs 78 of the trough belts 77 travel along the side wall surfaces 53a in contact therewith (see Figs. 7 and 8).

An outwardly extending lip 80 on the lower flanges 57 of each of the channels 59 in conjunction with the short channel section 67 retains the outer run of the trough belts in proper position on the pulleys 71 and 73. By adjusting the bearing members 66 with respect to the channels 59, the proper tension of the belts 77 is obtained.

Each shaft 74 has a bevel gear 81 fixed at its upper end which meshes with a bevel gear 82 at each side of the trough. The bevel gears 82 are keyed to a transverse shaft 83 rotatably mounted within bearings 84 of upstanding arms 85 which form integral parts of the frames 48 and 49.

A sprocket 86 is fixed to one end of the shaft 83 and trained thereover is a chain 87 which extends around a drive sprocket 88 secured to the cam shaft 41. The upper run of the chain 87 rides over an idler sprocket 89 rotatably mounted on the shaft 36 to pass the chain around the same.

The cam shaft 41 is driven in the direction of arrow 41a (counterclockwise) in Fig. 1 which causes corresponding rotation of the drive sprocket 88, sprocket 86, shaft 83, and bevel gears 82 which, in turn, effect rotation of the bevel gear 81 and drive pulley 73 on one side of the machine in clockwise direction, and the bevel gear 81 and drive pulley 73 on the other side of the machine in counterclockwise direction thereby causing the inner run of the belts 78 adjacent the faces 53a of the channels 59 to travel in the direction of arrows 77a (Fig. 4) from the receiving end to the discharge end of the trough.

Trained around an idler pulley 90, freely rotatable on the shaft 34, and a drive pulley 91, keyed to the shaft 36, is an auxiliary center belt 93 the upper run of which is disposed below the inner reaches 78 of the side belts 77 between the channel members 59 to form a bottom for the receiving end of the trough. The upper run of the center belt 93 is supported by a bridge plate 94 secured to the frame 49 at 95 to prevent sagging of the center belt. The shaft 36 is driven, as hereinbefore explained, by the cam shaft 41 through intermeshing gears 42 and 43. The ratio of the gears 42, 43 is such that the speed of rotation of the shaft 36 is slightly faster than the rotation of the drive shaft 83 so that the center belt 93 moves at a greater speed than the side belts 77.

From the foregoing, it will therefore be apparent that each pear discharged into the chute 31 by the elevator B gravitates down the inclined bottom 30 of the chute and is deposited haphazardly, i. e., with the stem blossom axis thereof disposed in almost any direction upon the receiving end of the center belt 93 which advances the same toward and into the V-shaped trough 60 formed by the side belts 77. The inner reaches 78 of the side belts 77 are so spaced with respect to each other and are so positioned with respect to the center belt 93 that when a pear is deposited upon the center belt with its stem-blossom axis substantially parallel to the longitudinal axis of the trough 60 and with the stem end either in leading or trailing position, the side belts do not turn the fruit but merely guide the same along the trough while the pear is solely supported on the center belt and is advanced by the same toward the middle of the trough.

However, should a pear enter the trough with its neck end leaning against one or the other of the side belts 77 while supported by the center belt 93 or should a pear be disposed transversely in the trough in such a position that it engages all three belts 77 and 93 the pear will be turned in the trough in view of the speed differential between the center belt 93 and the trough belts 77 until the pear is disposed with its stem-blossom axis substantially parallel to the longitudinal axis of the trough 60 with the stem end of the pear in either leading or trailing position. In other words, in such case a forward pull is exerted upon the portion of the pear resting upon the center belt, whereby the pear is turned until the portions resting on the trough belts 77 slide down the inclined sides thereof and the neck portion of the fruit is disposed in leading or trailing position upon the center belt 93 with the stem blossom axis of the pear substantially parallel to the longitudinal axis of the trough 60.

Positioned above and slightly projecting into the receiving end of the trough 60 is a yieldable baffle 100 pendently supported by an overhead support 101 having downwardly projecting legs 102 secured at 103 to the upper ends of the side walls 61 of the chute 31. This baffle plate may be made from rubber, canvas or any other suitable material of sufficient body to prevent the pears from rolling directly into the trough 60 out of control of the center belt 93. Such premature entry of a pear would bring the fruit too close to or directly in contact with the preceding pear in the trough 60 which, of course, would cause interference of one fruit with the other and prevent a correct orientation thereof. Furthermore, such close spacing of the fruit would prevent a correct timing of the travel of the individual pears along the trough and the discharge of the pears in timed intervals therefrom referred to more specifically later on.

Another function of the baffle 100 is to tip the pears over when the stem end thereof projects too far above the lower edge of the baffle plate as would be the case when a pear rests with its blossom end on the belt 93 with its stem end up and its stem-blossom axis in substantially vertical position as shown in Fig. 2. The baffle 100 must, however, be yieldable enough to permit passage of the pears therebeneath as they are advanced by the center belt into the trough 60 formed by the belts 77.

At the end of the upper run of the center belt 93 the pears are normally deposited upon the side belts 77 with the stem-blossom axis of the pears disposed substantially parallel to the longitudinal axis of the trough 60 so that the side belts engage the pears at chordally opposite points or zones on the bulb portion of the fruit slightly below the largest periphery thereof.

It will be noted that when the center of gravity of a pear is in a position other than substantially vertically above or below a transverse axis extending through the points of engagement of the bulb portion with the side belts, such pear will be in an unstable condition and by force of gravity will turn until it assumes a position of equilibrium, i. e., a position in which the stem portion hangs down with the stem-blossom axis of the fruit in a substantially vertical position.

From the foregoing it is apparent that as the pears are deposited upon the side belts by the center belt 93, they will engage the side belts to be pendently supported thereby and as the neck ends of the pears leave the center belt 93 during further conveyance of the fruit along the trough they will gravitate through the open bottom of the V-shaped trough until the stem-blossom axis of the pears assume a substantially vertical position stem end down.

Figures 10, 11, 12:
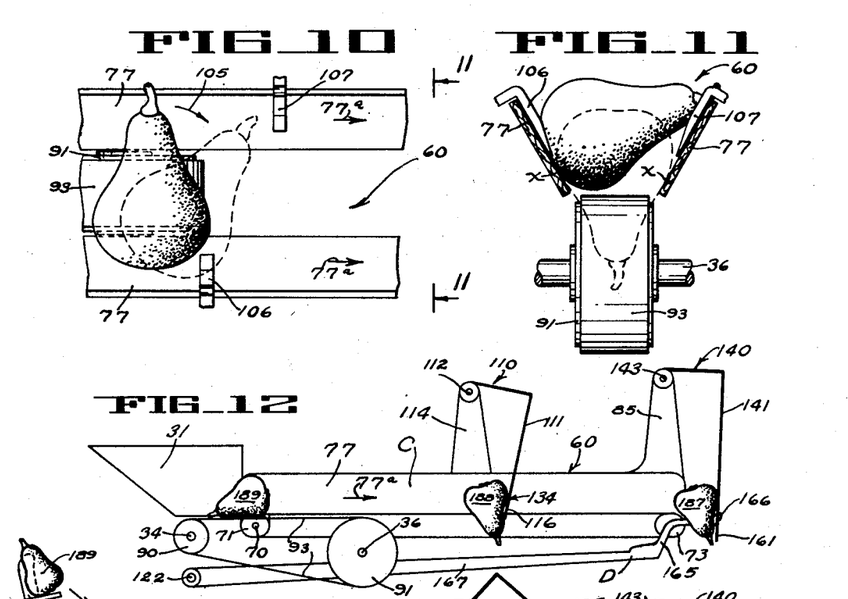
Fig. 10 is a fragmentary plan view of the midportion of the feed trough with a pear resting on the side walls thereof.
Fig. 11 is a vertical section of Fig. 10 taken along line 11—11 thereof.
Fig. 12 is a diagram illustrating the timing in the operation of the machine and showing the parts thereof in substantially the same position as shown in Fig. 2.

In case a pear assumes a position in the receiving end of the trough 60 in which it is solely supported by the inclined side belts 77 as shown in Figs. 10 and 11 the center belt 93 will not orient the same since it is not in contact therewith. For orienting a pear disposed in such position, stationary fingers 106 and 107 positioned in staggered relation at the upper portion of the trough at points at and beyond the end of the upper run of the center belt 93 are employed. These fingers 106 and 107 are secured to the frames 48 and 49, respectively, and project downward into the trough 60 closely overlying the inclined belts 77. The fingers 106 and 107 are tapered to a point terminating slightly above the zone of each belt 77 at which the bulb ends of the pears engage the belts 77 when they are deposited thereon by the center belt 93 as clearly shown in Fig. 11.

Therefore, when a pear transversely disposed in the trough 60 and solely supported by the side belts 77 strikes either one of the fingers 106 or 107, the fruit portion striking the finger will be held back while the portion of the fruit supported by the belt 77 at the opposite side of the trough continues its travel so that the fruit is turned, for example, in the direction of the arrow 105 in Fig. 10, until its stem-blossom axis is substantially parallel to the longitudinal axis of the trough with the stem end either in leading or trailing position. As the fruit is so turned the bulb portion thereof slides farther down into the trough to engage the belts 77 at zones thereof below the lower ends of the fingers 106 and 107 where the bulb portion of the pear is supported at diametrically opposite points of its periphery. The position of the center of gravity of such pear is thus changed and its stem end swings down through the open bottom of the V-shaped trough to pendently dispose the pear stem end down therein with the stem-blossom axis in substantially vertical position. Depending on the position of the pear either one of the fingers 106 or 107 may turn the fruit. However, if the first finger 106 turns the fruit the second finger 107 will not engage the same since as soon as the pear is oriented stem end down as shown in dotted lines in Fig. 11, the bulb portion of the fruit is supported by the side belts 77 at the zone of the belts below the end of the finger 107 and freely passes the same. A similar orientation of the fruit by the fingers 106 and 107 is obtained in case a pear has been incorrectly positioned and is advanced beyond the center belt with its neck portion leaning against one of the side belts 77.

It is to be noted that although the individual pears are fed by the elevator B in properly timed and spaced relation into the chute 31 and upon the center belt 93, the timed travel of the pears along the trough and their correct spacing with respect to each other is considerably altered during the various orienting operations to which the fruit is subjected. It is therefore necessary to correct the timing and spacing of the fruit before the same arrives at the discharge end of the trough.

This timing and spacing of the oriented fruit during its further travel toward the discharge end of the trough is effected by a fruit spacing and timing mechanism 110 positioned above the trough 60 intermediate the discharge end of the center belt 93 and the discharge end of the trough and beyond the finger 107. This fruit spacing and timing mechanism 110 comprises an inverted L-shaped fruit spacing arm 111 fixed to a shaft 112 journalled on upstanding brackets 113 and 114 mounted at 115 on the upper flange 56 of the channels 59 at opposite sides of the trough. The long shank 116 of the spacing arm 111 projects into and through the trough to a point slightly below the open bottom thereof and is disposed in rearwardly inclined position with respect to the longitudinal axis of the trough when the arm 111 is in a position as shown in full lines in Figs. 2, 9 and 12 so that the lower portion of the arm obstructs the passage of the pears along the trough. The shank 116 of the spacing arm 111 is V-shaped in cross section and of a width slightly less than the width of the open bottom of the trough (see Fig. 4) and normally tends to keep the pear centered in the trough.

Fixed to one end of the shaft 112 adjacent the bracket 114 is a lever arm 117 to which one end of a connecting rod 118 is pivotally secured (Figs. 1, 2 and 4). The other end of the connecting rod 118 is pivotally secured to the free end 119 of an actuating arm 120 which is mounted at 121 upon a shaft 122 for free rotation relative thereto. The shaft 122 is rotatably mounted in bearing portions 123 of the brackets 32 previously referred to.

The cam operated arm 120 is urged downwardly by a coil spring 124 having one end secured to the arm 120 and its opposite end anchored at 125 on the tank A. The arm 120 carries a laterally extending pin 126 on which a cam roller 127 is rotatably mounted. This cam roller 127 rides on the periphery of a cam disc 128 fixed on the cam shaft 41 for rotation therewith in the direction of arrow 41a (Fig. 2).

The cam disc 128 has a low dwell portion 130, a steep acclivity 131, a high dwell portion 132 and a steep declivity 133 for raising and lowering the free end of the arm 120 to thereby swing the spacing arm 111 up and down, out of and into the path of the pears in the trough in timed relation with the operation of the machine.

Figures 9, 13:
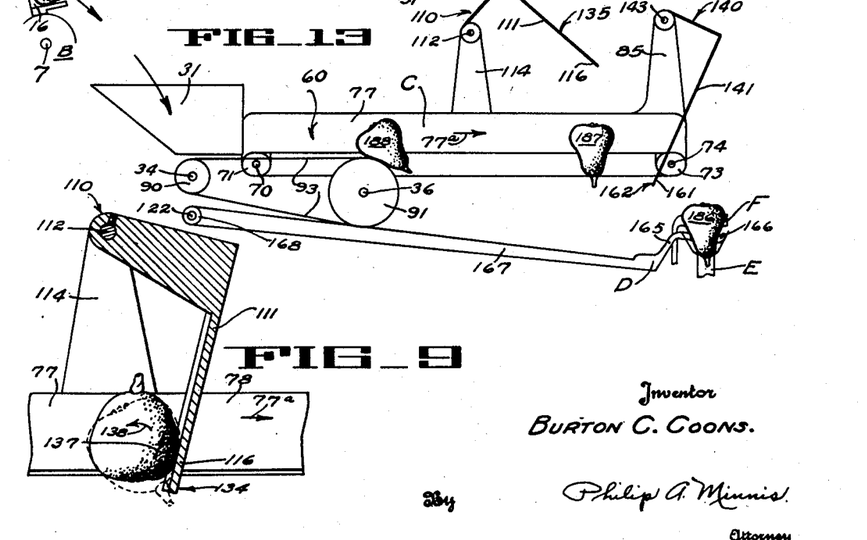
Fig. 9 is an enlarged sectional view through the spacing and timing mechanism of the machine to illustrate the pear orienting operation performed thereby.
Fig. 13 is a diagram similar to that of Fig. 12 but showing the parts of the machine in a different position.

After a pear has been oriented stem end down as previously described herein and while it continues its travel along the trough 60 toward the spacing and timing mechanism 110 the spacing arm 111 thereof is swung to its full line position into the path of the fruit, as shown at 134 in Figs. 2 and 9. When the fruit contacts the shank 116 of arm 111 its travel along the trough 60 is stopped, and in view of the width and V-shaped configuration of the shank 116 the pear is maintained in its oriented position. It should further be noted that the arm 111 remains in its lowermost or full line position, as shown at 134 in Fig. 2, for such length of time that irrespective of the distance of the fruit from the arm 111 when the arm arrives in its lowermost position, which of course varies due to variations in the timed travel of the fruit caused by the orienting operations performed upon the fruit, contact of the pear with the shank 116 of the arm 111 is assured.

After the travel of the pear along the trough 60 has been arrested in the manner as above stated the arm 111 is swung out of the way of the pear from its full line position 134 to its dotted line position 135 (Fig. 2) so that the pear is suddenly released at a predetermined moment in the operation of the machine and travels now in properly timed and spaced relation with respect to a preceding pear along the trough 60 toward the discharge end thereof.

In view of the L-shaped configuration of the arm 111 and its pivotal mounting in a manner as clearly shown in Fig. 2 the lower shank portion is rapidly moved away from contact with the fruit when the arm 111 is swung from its full line position 134 to its dotted line position 135 (Fig. 2) so that the pear is instantaneously released and its oriented position is not disturbed.

After the pear has been released by the arm 111 and has passed from underneath the same during its further advancement by the belts 77 along the trough 60 the arm 111 is returned to its full line position 134 (Fig. 2) for engagement with the next succeeding pear advanced along the trough and the next cycle of operation of arm 111 in regard to the next pear repeats in the same manner as described above.

It should be further noted, however, that in view of the inclined position of the shank 116 the bulb of each pear contacts the shank 116 at a zone slightly below the largest periphery of the pear and this is so regardless of whether the fruit has a long neck portion or is of the short neck or stubby variety.

Therefore, in case a pear should position itself stem end up during its travel along the trough 60 between the baffle 100 and the arm 111 and remain in this position until it contacts the shank portion 116 of arm 111 and its travel is arrested thereby as shown by the stubby pear in Fig. 9, the drag of the moving belts 77 on the bulb portion of the fruit at chordally opposite points X (Fig. 11) in the direction of arrow 77a (Fig. 9) tends to cause the bulb end of the pear to ride upwardly on the inclined arm portion 116 in the direction of arrow 137 whereby the pear is turned in the direction of arrow 138 about a diametrical axis substantially parallel to a transverse axis extending through said chordally opposite points of contact of the fruit with the belts 77. As this turning of the fruit continues it is assisted by the normal tendency of the center of gravity of the fruit to seek an equilibrium until the fruit is disposed stem end down with either the neck portion or the stem of the pear contacting the lower end of the shank portion 116 as shown in dotted lines in Fig. 9 whereby further turning of the fruit is prevented. In view of the V-shaped configuration of the shank portion 116 the stem-blossom axis of the fruit is held in a substantially vertical plane coincident to the longitudinal axis of the trough 60 during such rotation of the fruit. After the fruit has been positioned in this manner, it is instantaneously released for further travel along the trough 60 when arm 111 is swung out of the way in the same manner as heretofore described.

Positioned at the discharge end of the trough 60 is a timing and discharge mechanism 140, (Figs. 1, 2 and 4) which is similar in construction to the timing and spacing mechanism 110 hereinbefore described. This timing mechanism 140 functions to release each oriented pear for discharge from the trough 60 in properly timed relation with the reciprocation of the feed carriage G and the yoke D so that the oriented fruit may be subsequently deposited thereby into the feed cup E of the carriage G when the same is in its fruit receiving position as shown in Fig. 1.

The timing and discharge mechanism 140 comprises an inverted L-shaped arm 141 fixed at 142 to a transverse shaft 143 rotatably mounted in bearings 144 formed in the upstanding arms 85 previously referred to. Keyed to the shaft 143 is a lever 145 the free end of which is pivotally connected at 146 to one end of a connecting rod 147. The other end 148 of the connecting rod 147 is pivotally secured to the free end 149 of an actuating arm 150 which is mounted on the shaft 122 for free rotation relative thereto. The actuating arm 150 is urged downwardly by a coil spring 151 one end of which is secured to the arm 150 while the other end is anchored at 152 on the tank A. Rotatably mounted on the arm 150 by means of a pivot pin 153 is a cam roller 154 which rides on the periphery of a rotary cam 155 fixed to the cam shaft 41 for rotation therewith in the direction of arrow 41a (Fig. 2).

The periphery of the rotary cam 155 has a steep declivity 156, a low dwell portion 157, a slowly rising acclivity 158, a steep acclivity 159 and a high dwell portion 160 so that upon rotation of the cam 155 in the direction of arrow 41a (Fig. 2) the free end of the arm 150 is raised and lowered in conformity with the configuration of the periphery of the cam whereby the L-shaped arm 141 is swung back and forth in predetermined timed relation with respect to the spacing and timing arm 111 and the carriage G of the pear preparation machine.

The L-shaped arm 141 has a shank 161 having the same configuration as the shank portion 116 of the arm 111 previously described herein with the exception that the shank portion 161 is considerably longer than the shank portion 116. When the arm 141 is in its left hand or lowermost position, as shown in dot-dash lines at 162 in Fig. 2, the shank portion 161 thereof is disposed in rearwardly inclined position in the discharge end of the trough with the lower end of the shank portion 161 projecting through and a considerable distance below the open bottom of the V-shaped trough 60.

When a pear has been released by the timing arm 111 as hereinbefore described and has substantially passed from beneath the shank portion 116 as shown in dotted lines at 135 in Fig. 2, the timing arm 141 arrives in its lowermost position and is ready to arrest the travel of the pear as soon as it contacts the same. The arm 141 remains in its lowermost position for a predetermined period to assure proper contact of the fruit therewith irrespective of its distance from the arm 141 when the latter arrives at its position shown in dot-dash lines at 162 in Fig. 2. After the pear has properly contacted the arm 141 the arm begins to swing out of the trough 60 and moves gradually and slowly to the position shown in full lines in Fig. 2 and permits the pear to travel to a position as shown at 163.

Positioned below the discharge end of the trough 60 is the transfer yoke D which receives each oriented pear and transfers it in oriented position to the feed cup E of the carriage G in timed relation with the operation of the carriage G. The yoke D (Figs. 1 and 2) comprises spaced pear receiving and supporting members 165 having upwardly projecting pear engaging knobs 166 to provide a four point support for the pears received therebetween. The pear receiving members 165 are carried by a pair of spaced arms 167 secured to a hub portion 168 fixed to shaft 122 by set screws 169 for oscillation therewith. A transverse bar 170 secured to both arms 167 adjacent the pear receiving members 165 maintains the free end of the arms in properly spaced relation.

Fixed to the shaft 122 (Figs. 3 and 4) is a cam lever 171 to the free end of which a cam roller 172 is rotatably secured by means of a pivot pin 173. The cam roller 172 rides on a cam segment 175 fixed to the cam shaft 41 for rotation therewith. The roller 172 is held in engagement with the cam segment 175 by a coil spring 176 having one end secured to the cam lever 171 and its other end attached to the tank A at 177 (Figs. 3 and 4), so that during rotation of the shaft 41 the free ends of the arms 167 are oscillated up and down in timed relation with the operation of the timing arm 141 and the reciprocation of the carriage G and feed cup E of the pear preparation machine.

When the pear arrives at the position 163 (Fig. 2) the receiving members 165 are disposed in their uppermost position adjacent the discharge end of the trough 60 and while the arm 141 continues its outward movement away from the trough the pear is discharged therefrom stem end down upon the fruit receiving members 165.

At the same moment the arm 141 moves rapidly out of contact with the pear so that the oriented position of the pear is not disturbed. Thereupon the arms 167 with the pear supported on the pear supporting members 165 are lowered (Fig. 1) and the pear is transferred as shown in Fig. 13 into the feed cup E which at this time is in the fruit receiving position.

As seen in Fig. 1, downward movement of the transfer yoke D is limited by an adjustable stop 180 formed by a U-shaped bracket 181 the legs 182 of which are secured by slot and bolt connections 183 to arms 184 suspended from the frame members 48 and 49 so as to stop the fruit receiving members 165 when they arrive at a point slightly below the upper edge of the cup E where they completely release the fruit for support by the cup E and the aligning clamps F. However, since the cam segment 175 is designed to permit the yoke D to descend in a wide range it is therefore apparent that by adjusting the stop 180 the feeding and orienting mechanism may be adapted for installation on various types of pear preparation machines in which the feed cups are positioned at different heights.

The fruit supporting members 165 are so spaced that while they move downward they enter between the pear holding and aligning clamps F, which are in fully opened position, straddle the open sided conical cup E and move to a point slightly below the upper periphery of the same whereby the pear is deposited stem end down into the cup E with the bulb of the pear positioned between the pear holding and aligning fingers F. While the transfer yoke D remains in its lowermost position the feed cup E moves from its fruit receiving station (Fig. 1) to its fruit impaling station within the pear preparation machine (not shown), the pear aligning and holding fingers close upon the fruit whereby the pear is accurately aligned and firmly held in the cup E as clearly set forth in my patent above referred to.

As soon as the pear has been discharged from the trough 60 as stated above the arm 141 returns to its lowermost position as shown at 162 in Fig. 2 and is ready to intercept the next fruit and to control its discharge from the trough 60 to the yoke D in the same manner as stated above. When the feed cup E has moved away from the transfer yoke D the yoke returns to its uppermost position in time to receive the next pear under the control of the timing arm 141. Thereupon this next pear is transferred to the feed cup E when the feed cup arrives again at the feed station for the reception of the next fruit and the cycle of operation repeats in the same manner as hereinbefore stated during the further operation of the machine.

Each of the fruit receiving members 165 is adjustably secured to the arms 167 by a screw and slot connection 185 so that their position may be accurately adjusted with respect to the discharge end of the trough for small, medium, or large size pears.

In the continuous operation of the machine of the present invention one pear after another is deposited by the elevator B at properly timed intervals into the chute 31 for gravitation onto the center belt 93 and moves along the trough 60 until discharged therefrom and transferred by the yoke D to the feed cup E of the pear preparation machine. The arms 111 and 141 are so timed with respect to each other that when arm 141 is in the full line position as shown in Fig. 2 and the pear 186 in contact therewith is about, but not quite, deposited upon the receiving members 165 of the yoke D, the succeeding pear 187 is in contact with the arm 111 which is ready to instantaneously release the pear 187 for further travel along the trough 60, while a new pear 188 has just been deposited upon the center belt 93.

When the arm 111 arrives in its uppermost position 135, the pear 187 is approximately in a position as shown in Fig. 13. The pear 186 has been discharged and the arm 141 is back in its lowermost position as shown at 162 in Fig. 13 ready to receive pear 187. As soon as pear 187 has contacted the arm 141 and is about to be discharged upon the yoke D, pear 188 has contacted the arm 111 and the next pear 189 is deposited by the elevator into chute 31 and upon the center belt 93. At this time the arms 111 and 141 and the three pears now in the trough are in the position as shown in Fig. 12 and the foregoing cycle of operation of the machine repeats during the continuous operation thereof.

The machine of the present invention is equally well adapted for feeding "long shank" as well as "stubby" pears and by reason of the lubricating effect of the water adhering to the pears, the friction caused by engagement of the pears with the belts and timing arms will be substantially uniform regardless of the state of ripeness of the fruit. It is therefore apparent that the state of ripeness of the fruit does not affect the proper positioning thereof. While it is preferable to grade the fruit this is not necessary, however, since due to the inclination of the trough belts 77 a proper contact of each fruit at diametrically opposite points at the bulb portion thereof is always assured irrespective of the size of the fruit. If the pears are not graded the pear receiving members 165 of the yoke D are adjusted in such position that they will properly receive and support the small as well as the large fruit.

While I have shown and described a preferred apparatus for carrying out my invention, it will be understood that it is capable of variation and modification, while still employing the principle of my invention and I deem myself entitled to all such variations and modifications as come within the scope of the claims appended hereto.

Having thus described my invention, and in what manner the same may be used, what I claim as new and desire to protect by Letters Patent is:

1. An apparatus for orienting pears and feeding them into the feed receptacle of a pear handling machine comprising a trough having a discharge end arranged above said feed receptacle when the latter is in pear receiving position, means for feeding pears one at a time into the trough, means in the trough for moving the pears to the discharge end thereof, means for engaging the pears as they are moved by the moving means and cooperating therewith to turn said pears into a position with their stem ends facing in a predetermined general direction, and means movable toward and away from the discharge end of the trough for centering said pears in said trough and for controlling the discharge of the positioned pears therefrom.

2. An apparatus for orienting pears and feeding them into the feed receptacle of a pear handling machine comprising a trough having a discharge end arranged above said feed receptacle when the latter is in pear receiving position, means for feeding pears one at a time into the trough, means in the trough for moving the pears to the discharge end thereof, means for engaging the pears as they are moved by the moving means and cooperating therewith to turn said pears into a position with their stem ends facing in a predetermined general direction, means movable toward and away from the discharge end of the trough for centering said pears in said trough and for controlling the discharge of the positioned pears therefrom, and means movable from the discharge end of said trough toward said feed receptacle for transferring the positioned pears from the trough to the feed receptacle.

3. A pear orienting and feeding apparatus comprising a feed trough adapted to receive pears one at a time, including means for moving said pears along said trough to the discharge end thereof, means in said trough and cooperating with said pear moving means to engage the pears moved thereby to turn the pears into a predetermined position with their stem ends facing in the same general direction and to release the positioned pears for movement along said trough in spaced relation, stop means disposed in said trough and engageable by pears moving therealong to restrain movement of said pears while centering the same in said trough, and means for oscillating the stop means to release said positioned pears for discharge from said trough in said predetermined position at predetermined timed intervals.

4. A pear feed comprising parallel conveying members spaced from each other to support the pears by their bulb portions for movement along a predetermined path, means for driving the conveying members, means associated with said conveying members and cooperating with the latter as they move the pears to position the pears in said path with their stem ends suspended between said conveying members, a feed receptacle arranged adjacent the discharge end of the conveying members to receive the positioned pears stem end first, and means movable from the discharge end of the conveying means toward said feed receptacle for transferring the pears stem end first from the conveying members to the feed receptacle at predetermined timed intervals.

5. A pear feed comprising spaced conveyor members arranged to form a trough, means for driving said conveyor members to advance pears along said trough, means for depositing pears on said conveyor members with their stem-blossom axes in a substantial vertical plane between the latter, means intermittently movable into and out of said trough for engaging the pears moved therealong to position said pears with their stem ends disposed in a predetermined general direction and for releasing said pears for discharge from said trough at predetermined timed intervals.

6. A pear feeding apparatus comprising a pair of conveyors arranged in side by side spaced relation to form a sloping sided open bottomed pear receiving trough in which the pears are supported and conveyed between said conveyors, means for operating the conveyors to advance the pears along the trough, a gate operable in said trough intermediate its ends for engagement with the pears travelling therealong, means for periodically moving said gate into and out of the path of the pears to alternately stop and release the pears at timed intervals whereby they are uniformly spaced for delivery at uniformly timed intervals, a transfer device disposed at the discharge end of said trough to receive pears discharged from the trough, and means for operating the transfer device to move it into and out of pear receiving position in timed relation with the operation of said gate.

7. A pear orienting and feeding apparatus comprising a pair of lateral conveyors arranged in side by side spaced relation to form a sloping sided pear receiving trough therebetween, an auxiliary conveyor extending longitudinally of said trough to form a bottom therefor and to cooperate with said lateral conveyors in supporting and conveying pears along the trough, and means for driving all of said conveyors to advance the pears along the trough, said auxiliary conveyor being driven at a different speed than the lateral conveyors whereby to exert a twisting action on pears lying crosswise of the trough to cause them to be turned with their axes parallel with the trough.

8. A pear orienting and feeding apparatus comprising a pair of lateral conveyors arranged in side by side spaced relation to form a sloping sided pear receiving trough therebetween, an auxiliary conveyor extending longitudinally of said trough to form a bottom therefor and to cooperate with said lateral conveyors in supporting and conveying pears along the trough, and means for driving all of said conveyors to advance the pears along the trough, said auxiliary conveyor being driven faster than the lateral conveyors whereby to exert a twisting action on pears lying crosswise of the trough to cause them to be turned with their axes parallel with the trough.

9. A pear orienting and feeding apparatus comprising a pair of conveyor belts arranged in side by side spaced relation to form a sloping sided pear receiving trough therebetween, an auxiliary conveyor extending longitudinally of said trough to form a bottom therefor and to cooperate with said pair of conveyor belts in supporting and conveying pears along the trough, and means for driving said conveyor belts and auxiliary conveyor to advance the pears along the trough, said auxiliary conveyor being driven at a different speed than said pair of conveyor belts whereby to exert a twisting action on pears lying crosswise of the trough to cause them to be turned with their axes parallel with the trough.

10. A pear orienting and feeding apparatus for a pear handling machine having a fruit receptacle movable into and out of a pear receiving station, comprising means arranged to receive individual pears for conveying them in successive order to a point of discharge above said pear receiving station, means associated with said conveying means and cooperating with the latter to dispose the pears moved thereby into a position with their stem ends facing in the same direction, and means at said point of discharge for receiving the positioned pears from said conveying means and movable toward said fruit receptacle for transmitting successive pears into said fruit receptacle in timed relation with the arrival of the latter at said receiving station.

11. A pear orienting and feeding apparatus comprising a pair of lateral conveyors arranged in side by side spaced relation to form a sloping sided pear receiving trough therebetween, the lower part of said trough being wider than the neck diameters of the pears but narrower than the bulb diameters of the pears, an auxiliary conveyor extending longitudinally of said trough to form a bottom therefor and to cooperate with said lateral conveyors in supporting and conveying pears along the trough, and means for driving all of said conveyors to advance the pears along the trough, said auxiliary conveyor being driven faster than the lateral conveyors whereby to exert a twisting action on pears lying crosswise of the trough to cause them to be turned with their axes parallel with the trough, said auxiliary conveyor terminating short of the discharge end of the trough whereby the remainder of the trough is open bottomed and the pears are thereby left free to gravitate into neck downward position as they are carried by the lateral conveyors beyond the end of the auxiliary conveyor.

12. A pear orienting and feeding apparatus comprising a pair of lateral conveyors arranged in side by side spaced relation to form a sloping sided pear receiving trough therebetween, the lower part of said trough being wider than the neck diameters of the pears but narrower than the bulb diameters of the pears, an auxiliary conveyor extending longitudinally of said trough to form a bottom therefor and to cooperate with said lateral conveyors in supporting and conveying pears along the trough, means for driving all of said conveyors to advance the pears along the trough, said auxiliary conveyor being driven faster than the lateral conveyors whereby to exert a twisting action on pears lying crosswise of the trough to cause them to be turned with their axes parallel with the trough, said auxiliary conveyor terminating short of the discharge end of the trough whereby the remainder of the trough is open bottomed and the pears are thereby left free to gravitate into neck downward position as they are carried by the lateral conveyors beyond the end of the auxiliary conveyor, a gate operable in said trough intermediate its ends for engagement with the pears travelling therealong, and means for periodically moving said gate into and out of the path of the pears to alternately stop and release the pears at timed intervals whereby they are uniformly spaced for delivery at uniformly timed intervals.

13. A pear orienting and feeding apparatus for a pear handling machine having a fruit receptacle movable to and from a pear receiving position to receive pears in an oriented condition, comprising a supply hopper for receiving a promiscuous mass of pears, means for discharging pears from said hopper one at a time, a pear aligning trough arranged to receive pears from said pear discharging means, means for moving said pears along said trough toward the discharge end thereof, means in said trough and cooperating with said pear moving means for turning the pears into a position with their stem ends facing in a predetermined general direction in the course of their movement therealong, means arranged between said fruit receptacle and the discharge end of said trough for receiving the pears therefrom with their stem ends facing in the same general direction, and means for moving said pear receiving means toward said receptacle in synchronism with the discharge of pears by said pear moving means and the movement of said fruit receptacle into said pear receiving position to deposit pears into said fruit receptacle in oriented condition at predetermined timed intervals.

14. A pear orienting and feeding apparatus comprising spaced movable members arranged to form an open bottomed trough adapted to contact the pears at chordally opposite points on the bulb portion thereof to support the fruit while permitting the same to turn freely under the weight of their neck portions into stem end down position in said trough, means for moving the movable members to advance pears toward the discharge end of said trough, means arranged adjacent said movable members and extending into said trough to a point substantially above the points of contact of the pears with said movable members for obstructing movement of a portion of a pear extending angularly and upwardly in said trough to turn such pear to a position where its neck portion will gravitate through the open bottom of said trough, and oscillating means movable into and out of said trough to momentarily restrain normal movement of the pears by said movable members and to release said pears for discharge from said trough at predetermined timed intervals.

15. A pear orienting and feeding apparatus comprising a pair of conveyors arranged in side by side spaced relation to form a sloping sided pear receiving trough therebetween for conveying pears therealong, an auxiliary conveyor extending longitudinally of said trough to form a bottom therefor, and means for driving said auxiliary conveyor at a different speed than said pair of conveyors for maintaining pears conveyed thereby in a position within said trough with their stem-blossom axes in substantial alignment relative thereto.

16. A pear orienting and feeding apparatus comprising a pair of conveyors arranged in parallel spaced relation to form a pear conveying trough, means for driving the conveyors to advance the pears along the trough to the discharge end thereof, means extending into said trough at staggered positions therealong and cooperable with the conveyors as they move the pears for urging pears with their stem-blossom axes extending crosswise of the trough into a position with their stem blossom axes in substantial alignment therewith, said trough having an open bottom for permitting the neck ends of the pears to gravitate into pendently supported position whereby the pears are conveyed along said trough without contacting said pear urging means, means normally disposed in said trough for engaging the pears therein to center their stem blossom axes relative thereto, and means for instantaneously moving said centering means out of said trough to release the pears without disturbing their centered position and to space the pears along the trough for discharge therefrom at predetermined timed intervals.

17. An apparatus for orienting and feeding pears comprising spaced conveyors for engaging pears at chordally opposite zones on their bulb portion to pendently support said pears therebetween, an auxiliary conveyor extending into the receiving end of the spaced conveyors for delivering the pears into supporting engagement with said spaced conveyors, and means cooperating with the auxiliary conveyor for positioning the pears thereon with their stem-blossom axes substantially parallel to the longitudinal axis of the spaced conveyors whereby said pears are deposited by the auxiliary conveyor upon said spaced conveyors for free rotation into a position with their stem ends hanging downwardly.

BURTON C. COONS.

REFERENCES CITED

The following references are of record in the file of this patent:

UNITED STATES PATENTS

| Number | Name | Date |
|---|---|---|
| 580,742 | Vrooman et al. | Apr. 13, 1897 |
| 676,761 | Morris | June 18, 1901 |
| 1,427,264 | Clear | Aug. 29, 1922 |
| 1,556,469 | Alderman | Oct. 6, 1925 |
| 1,609,994 | Ellis | Dec. 7, 1926 |
| 1,824,693 | Smith | Sept. 22, 1931 |
| 2,336,676 | Erickson et al. | Dec. 14, 1943 |